July 13, 1948.  H. P. BENTLEY  2,445,016
WORK MANIPULATOR

Filed June 14, 1945  3 Sheets-Sheet 1

INVENTOR.
Harold P. Bentley
BY Theodore E. Simonton

July 13, 1948.   H. P. BENTLEY   2,445,016
WORK MANIPULATOR

Filed June 14, 1945   3 Sheets-Sheet 2

INVENTOR.
Harold P. Bentley
BY Theodore E. Simonton

July 13, 1948. H. P. BENTLEY 2,445,016
WORK MANIPULATOR
Filed June 14, 1945 3 Sheets-Sheet 3

INVENTOR.
Harold P. Bentley
BY
Theodore L. Simonton

Patented July 13, 1948

2,445,016

UNITED STATES PATENT OFFICE 2,445,016

WORK MANIPULATOR

Harold P. Bentley, Syracuse, N. Y.

Application June 14, 1945, Serial No. 599,366

8 Claims. (Cl. 29—288)

The invention relates to improvements in work manipulators and, more particularly, to work manipulators of the kind designed to support, move and position work for the efficient performance of welding or other operations on the work. Work required to be handled by manipulators of this kind varies in weight from a few pounds to several tons, and the wide variety of welding and/or other operations performed on such work makes it necessary that the manipulator be capable of imparting a wide variety of manipulations and positions to the supported work.

The general purpose of the invention is to provide a work manipulator of the class set forth whereby the work may be moved in a maximum variety of paths to a maximum variety of positions for effective, convenient and safe performance of the required operation or operations by a workman or workmen; whereby the work is supported and manipulated by means characterized by a maximum of sturdiness, rigidity and compactness and by maximum accessibility to supported work; and whereby a safe and durable rotative and tiltable mount is provided for the work supporting head of the manipulator.

A further purpose of the invention is to provide a work manipulator of the class set forth having improved means for tiltably and rotatably supporting the work for movement about crossed axes of tilt and rotation, and improved operating and controlling means for said work supporting means and, particularly, to provide a compact manipulator having means for both rotating the work at rates within a wide range of speed of rotation and for tilting the work through a large angle with a minimum of obstruction by the manipulator of access to the work in all positions of the work.

Another purpose of the invention is to provide a compact work manipulator of the class set forth having an improved compact construction of main framework adapted to be seated upon or bolted to a floor or other horizontal support and also to be secured or bolted in different vertically adjusted positions to an upstanding column or pedestal with the floor-engaging side of the frame vertically disposed.

Other purposes and advantages of the invention will appear from the following description in detail of the illustrative and preferred embodiment of the invention shown in the accompanying drawings.

Figure 1:
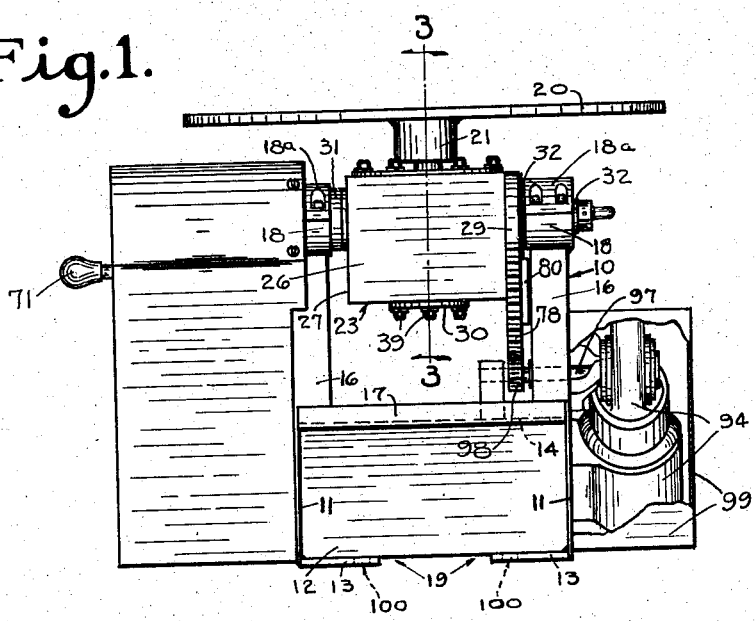
Figure 1 is an end elevation of the work manipulator as it appears when seated upon or secured to a floor or other horizontal support, the work supporting head of the manipulator being shown disposed horizontally.
Figure 2:
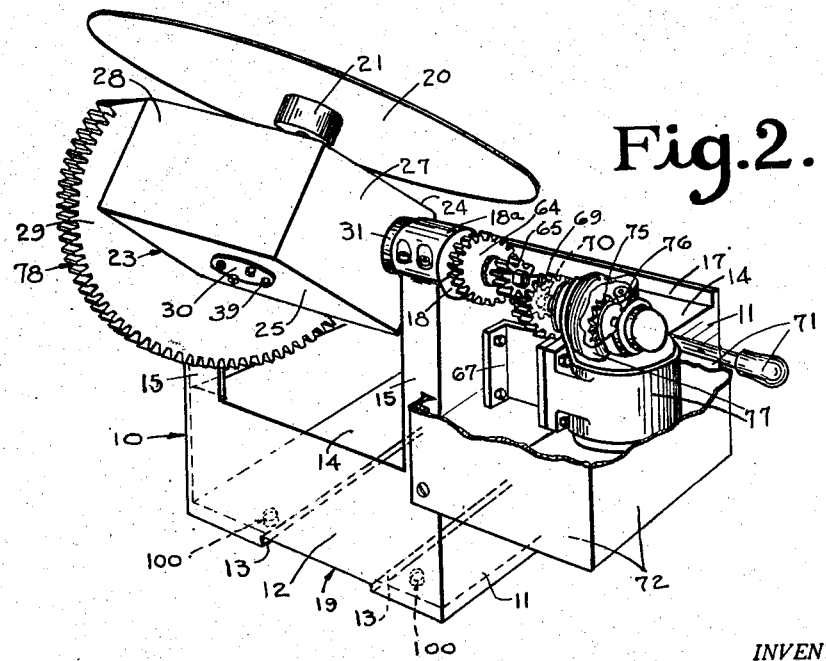
Figure 2 is a perspective view of the manipulator as viewed partly from the opposite end thereof from that shown in Figure 1, the work supporting head being shown tilted at an angle to the horizontal.

The manipulator proper has a rigid metallic main frame designated as a whole by numeral 10. Said main frame comprises two flat side walls 11, a flat end wall 12, a divided flat wall 13—13, a flat wall 14 opposed and parallel to wall 13—13, two wall stiffening flanges 15 and 16 for each of the side walls, a wall stiffening flange 17 for wall 14, and one-half of each of two short axially aligned and longitudinally divided cylindrical bearing sleeves 18—18a, said frame parts preferably being formed separately and welded together to provide a unitary main frame which is light and compact and extremely sturdy and rigid. The upper half of each sleeve 18 is bolted to the lower half.

The frame thus formed has an elongate boxlike portion of rectangular cross-section closed at one end by wall 12 and open at its opposite end, the wall 13—13 of this portion of the frame having a longitudinal opening 19 extending from end to end thereof medially of said wall. The side walls 11 extend beyond the outer face of wall 14, and the projecting portion of each of these side walls has the shape of a right angle triangle. One edge of the projecting portion of each wall 11 is perpendicular to wall 14 and is provided with one of the flanges 15, the flanges 15 lying in the plane of end wall 12. The flanged edges 16 of the projecting portions of the walls 11 are inclined to wall 14 and join wall 14 adjacent, but preferably short of, the open end of the box-like portion of the frame. One bearing sleeve 18—18a is located at the juncture of the flanged edges 15 and 16 of each wall 11 with said aligned sleeves extending transversely of the walls 11.

As hereinafter more fully described, the main frame 10 is adapted to be secured to a floor or other horizontal foundation with wall 13—13 seated on said floor or foundation, and also is adapted to be adjustably secured to an upstanding column or pedestal telescoped in the box-like portion of the frame. This frame construction is such that it is possible, by reason of such frame construction and by reason of other related features of construction hereinafter described, to rotate continuously about one axis and also to swing about a crossing and offset axis through a large angle of about 135 degrees a rotative work supporting head the diameter of which is considerably greater than the spacing of the bearings about which the head is swung, to safely support work much larger than the frame for access thereto from various angles with the frame supported either with its wall 13—13 seated on a horizontal foundation or with the frame held to an upstanding column with its wall 13—13 parallel to the longitudinal line of the column, and to accomplish other ends and to attain other advantages including those hereinafter and hereinbefore pointed out.

The features of construction in the embodiment shown associated with this frame for rotating the work relatively to the frame and for swinging or tilting the work relatively to the frame either concomitantly with or independently of rotation of the work will now be described.

In the construction shown, there is provided a work-carrying head 20—21 comprising a disk-like portion 20 to one face of which the work is clamped, bolted, or otherwise secured, and a central hub portion 21 preferably welded to portion 20 for convenient and cheap manufacture of the head, the hub portion 21 protruding as shown from the other face only of portion 20. It will be noted that the diameter of the head shown is several times greater than the distance between the flanged projecting portions of the side walls 11 of the frame and the distance between the bearing sleeves 18—18a for the trunnions hereinafter described, which sleeves and trunnions support the head, as hereinafter described, for tilting movements. This novel closely juxtaposed relation of the walls 11 and trunnion bearings 18—18a relatively to the diameter of head 20—21 provides an extremely sturdy non-sagging and non-twisting tilting support for a large head, said advantageous characteristics being enhanced by features about to be described.

The head is mounted on a rotative spindle 22 which extends centrally through a substantially rectangular box-like metal casing which is preferably oil-tight and substantially filled with oil and is designed as a whole by the numeral 23. This casing has two opposed walls 24 and 25 through the center of which the spindle 22 extends and in which the spindle is rotatively journaled, as hereinafter described. Walls 24 and 25 are connected by three walls 26, 27, 28 and by a fourth wall 29 to form the box-like casing 23. Wall 29, as hereinafter described, is extended to form a toothed gear segment forming part of a power drive for tilting the casing. Said six walls of the casing 23 are preferably welded together at their junctures, wall 24 having a removable central portion 24a hereinafter described. A central closure cap 30, hereinafter described, is detachably held to wall 25 over a central opening in the latter wall.

The casing 23 is journaled in bearings 18—18a by the following described means to tilt about an axis crossing but offset from the spindle and the axis of rotation of the work-carrying head. The casing is provided with two axially aligned hollow cylindrical trunnions 31 and 32 which extend through the bearing sleeves 18—18a and into the casing 23 through casing walls 27 and 28 adjacent the juncture of casing walls 24 and 26. The inner ends of these trunnions fit in different ones of two cylindrical and axially aligned sleeves 33, which sleeves are welded to walls 27 and 28 and extend into casing 23 from said walls. The trunnions are removably held to sleeves 33 by stud bolts 34 which are threaded into said sleeves and extend through circumferentially flanged annular collars 35 formed on the trunnions substantially medially of the ends of the trunnions. Each sleeve 33 and the adjacent trunnion bolted thereto thus form in effect a two-part trunnion. The flanges on the collars 35 project slightly beyond the heads of bolts 34 and substantially abut the adjacent ends of bearing sleeves 18—18a welded to the main frame.

The casing 23, and its connected trunnions 31 and 32 and sleeves 33, are all thus journaled in bearings 18—18a for tilting or rocking thereof as an operative unit about an axis which crosses the axis of the spindle at a right angle but is offset from the spindle and located adjacent the juncture of walls 24 and 26 of the casing. The size of casing 23 is such that it may swing through an angle of at least 135 degrees between the projecting flanged portions of frame walls 11 or frame 10 to position the casing with both the casing wall 24 and the adjacent and parallel work-supporting head 20 parallel with frame wall 12 and the flanged edges 15 of frame walls 11 or parallel with the flanged edges of 16 of frame walls 11, or to position said casing wall 24 and the adjacent and parallel head 20 at any intermediate point about the axis of tilt of said casing and head.

Figure 3:
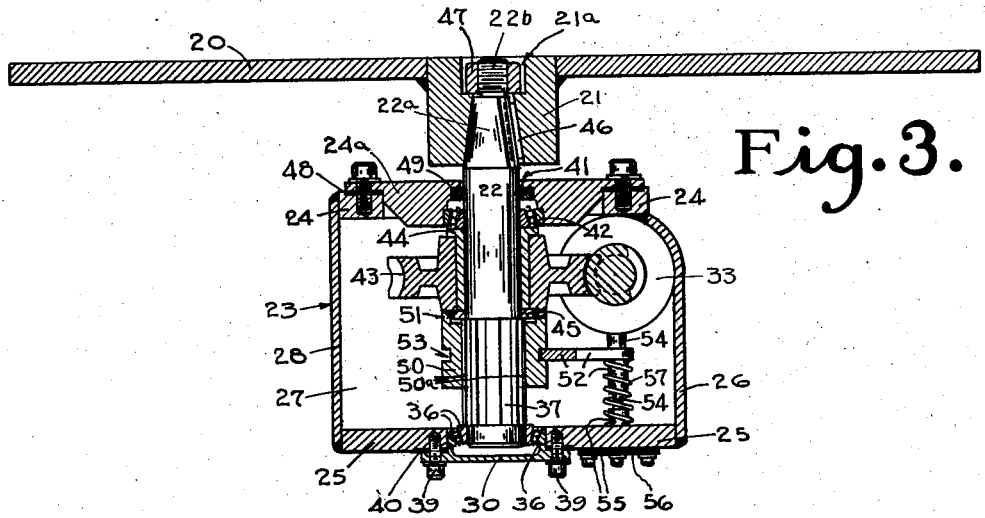
Figure 3 is a detail sectional view on line 3—3 of Figure 1.
Figure 4:
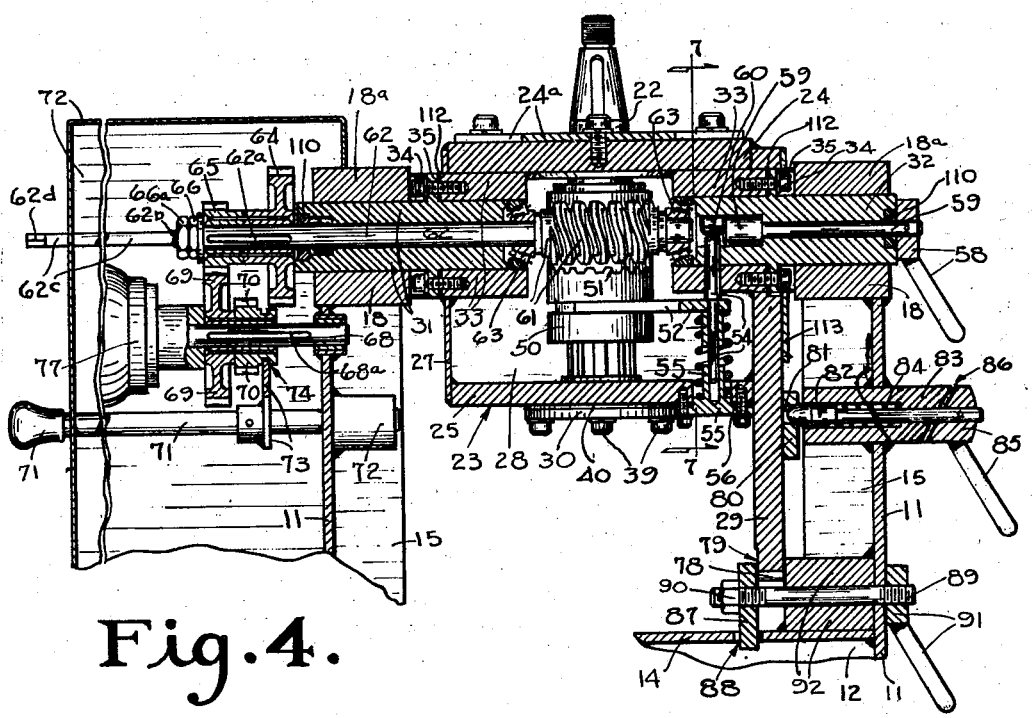
Figure 4 is a detail sectional view on the line 4—4 of Figure 5, but showing the work supporting head positioned as in Figure 1 relatively to the main frame of the manipulator.

Spindle 22 is journaled at one end in wall 25 of casing 23 by means of an antifriction thrust bearing assembly 36 and is provided within the casing with an enlarged cylindrical portion provided with parallel longitudinal grooves 37. The thrust bearing assembly 36 is held between the cover 30 and the spindle shoulder at the lower end of the enlarged portion of the spindle. Cover 30 is held to wall 25 by bolts 39. Spindle 22 extends out through a bore 41 in portion 24a of wall 24 of casing 23 and is journaled in said wall portion by a second antifriction thrust bearing assembly 42. A worm wheel 43 is loose on a quill or sleeve 44 which has a tight pressed fit spindle 22. Sleeve 44 has at one end thereof an annular flange between which and an annular shoulder in bore 41 the bearing assembly 42 is held. A washer 45 is held between sleeve 44 and the shoulder provided by the adjacent end of the enlarged and longitudinally grooved portion of the spindle. The two thrust bearing assemblies are arranged to take end thrust in different directions. The spindle passes through bore 41 without contact with the bore, as shown in Figure 3.

Just outside of wall portion 24a of casing 23 the spindle has a conoidal tapered portion 22a which extends through a correspondingly tapered portion of the bore of hub 21 of the head 20. A key 46 detachably interlocks the tapered portion of the spindle with said hub for rotation of the head with the spindle. Beyond portion 22a the spindle terminates in a reduced screw-threaded end portion 22b upon which is threaded a nut 47 which detachably clamps the head on the spindle. Nut 47 and the spindle portion 22b are located with a recess 21a in the hub 21 so as not to protrude beyond the work supporting surface of the head 20.

A sealing gasket 40 prevents leakage of lubricating oil from casing 23 around cover 30, a sealing gasket 48 prevents escape of oil from casing 23 around wall portion 24a, a sealing gasket 49 prevents escape of oil through bore 41, sealing gaskets 110 prevent oil escape through the trunnions 31 and 32, and sealing gaskets 112 prevent oil escape through sleeves 33, the casing containing a supply of lubricating oil, not shown.

The worm wheel 43 is normally but releasably connected with the spindle to rotate the spindle in one direction or the other depending upon the direction of rotation of said wheel. A clutch member 50 is slidable axially of the spindle on the enlarged and longitudinally grooved portion of the spindle and is provided with splines 50a slidably engaged in the grooves 37 in said spindle portion. The adjacent ends of clutch member 50 and worm wheel 43 are formed with clutch teeth 51 engageable for two-directional rotary motion transmission.

A forked clutch-shifting arm 52 has its forked end engaged in a circumferential groove 53 in clutch member 50. A plunger 54, slidable through registering radial bores in trunnion 32 and the associated sleeve 33, has a reduced portion slidably which extends through arm 52 and is in a guide 55 which is bolted to wall 25. A gasket 56 prevents escape of oil from casing 25 past this guide. A coil spring 57 normally urges the plunger 54 and arm 52 and clutch member 50 to clutch together the spindle 22 and worm wheel 43. An operating handle 58, located outside of the framework at the outer end of trunnion 32, is detachably fixed to a shaft 59 which is journaled in an axial bore in said trunnion. This bore is enlarged at the inner end of the trunnion, and the shaft 59 has in this enlarged bore portion an enlarged cylindrical portion from which extends an eccentrically arranged pin 60 overlapping the adjacent end of the plunger 54 which is normally projected into the enlarged bore portion. By turning handle 58 through a half-revolution in either direction the plunger may be moved through pin 60 in opposition to spring 57 to release the clutch and to lock the clutch in released position, if desired, with pin 60 and plunger 54 positioned as shown in dotted lines in Figure 7.

The head 20 is rotatively drivable by a reversible and variable speed driving means which is compact and inexpensive and also is powerful and economical in operation. This driving means includes the spindle, worm wheel and clutch above described and the parts now to be described.

Meshing with worm wheel 43 is a worm 61 which is fixed on a shaft 62 with its ends abutting two antifriction thrust bearing assemblies 63—63 which extend into sleeves 33 and abut the inner ends of trunnions 31 and 32 to each take end thrusts in different directions from the other. Shaft 62 terminates at one end thereof short of the plunger 54 and of the plunger actuating pin 60, and the other end of the shaft projects beyond the outer end of trunnion 31 and a housing 72 hereinafter described.

Keyed by key 62a on said projecting portion of shaft 62 are the larger and smaller spur gears 64 and 65 of a change speed gearing assembly of the slidable spur gear type. A nut 66 and a lock nut 66a are threaded on the shaft 62 to hold the gears 64 and 65 against the outer end of trunnion 31. Gears 64 and 65 are pinned together, as shown, to rotate in unison, but may be formed as a single integral unit if desired. A bracket 67 extends outwardly from the adjacent wall 11 of the main frame 10 and is bolted thereto, this frame wall being the one adjacent wall 27 of casing 23. A short shaft 68, parallel to shaft 62, is journaled in said frame wall and in the casing of a known electric motor 77 which is held to the bracket 67. Slidably keyed by 68a to said shaft 68 for rotation therewith and axial shifting relatively thereto as a unit are the larger and smaller axially shiftable or slidable spur gears 69 and 70 of the above mentioned change speed gearing assembly. Gears 69 and 70 are pinned together to shift and rotate as a unit, as shown, but may be formed as an integral unit if desired.

A manually operable plunger or push-rod 71 is axially slidable in the adjacent wall 11 of main frame 10 and in a wall of a housing 72 which is detachably fastened to said frame wall. A gear shifting fork 73 is pinned to said rod 71 with its forked end engaged in a circumferential groove 74 in the hub of gear 70.

The known gearing included in the gear head motor 77 comprises a worm wheel 75, fixed on the counter shaft 68 of the motor, and a worm 76 which meshes with wheel 75 and is fixed on the armature shaft of motor 77. The motor 77 is a known variable speed and reversible motor of the gear head type having the usual controls (not shown) for drive reversing and speed varying. The worm gearing 75—76 is a speed reducing and delivered torque increasing worm gearing of the non-self-locking type, while the worm gearing 43—61 is a speed reducing and delivered torque increasing worm gearing of the self-locking type. Shaft 62, beyond the threaded portion 62b thereof on which nuts 66 and 66a are threaded, has a reduced portion 62c having a squared outer end portion 62d for application of a hand crank or wrench to manually rotate the shaft when desired.

It will be obvious that the head 20 may be tilted in opposite directions and through a large angle (135° in the construction shown) by rocking the casing 23 in bearings 18—18a. It is desirable that such tilting may be accomplished by hand and/or by power means, and it is also desirable that the head may be securely held, if desired, in any selected one of a plurality of predetermined angularly tilted positions of the head or at any tilted position within the range of tilting movement of the head, as the work being done may require, and also that the head may be tilted without being rotated and also while being rotated, as may be desired. To these ends, the following provisions are made in the construction shown.

The wall 29 of casing 23 is extended beyond the casing and has the form of a toothed gear segment having a toothed arcuate edge 78, the toothed edge of the segment being located beyond the bounds of the casing and extending concentric with the axis of tilt of the casing. This extended toothed portion of wall 29 has, adjacent said toothed edge, an arcuate friction or braking side face surface 79. To the outer face of this combined casing wall, gear segment and friction locking element 29—78—79 there is fixedly secured an arcuate strip 80 which is concentric with the axis of tilt and has therein a row of spaced holes 81 disposed along a line concentric with said axis. A locking plunger 82 is slidably guided in a guide 83 and is normally urged by a spring 84 to engage in any registered one of the holes 81 to lock the casing 23 and head 20 in a desired one of the tilted positions determined by holes 81. A handle 85 is located outside of and close to the adjacent wall 11 and is pinned to plunger 82, and said handle and the plunger guide 83 have coacting cam edges 86 effective upon partial rotation of the handle to retract the plunger from any one of the holes 81 in which it is engaged and hold it so retracted.

In order to lock the head at will in positions not determined by holes 81, there is provided a brake or friction-locking block 87 which is slidable along, and held against turning by, a slot 88 in the adjacent wall 14 of the main framework 10. To clamp this block 87 to and release it from the braking or friction surface 79 of the element 29—78—79, there is provided a bolt 89, a nut 90, and an operating handle 91. The bolt has one threaded end screwed through block 87. The nut 90 is screwed on this end of the block at the opposite face of the block from that which is engageable with surface 79. The bolt extends through the adjacent frame wall 11 and also through a boss 92 which is welded to said frame wall. The bolt has a second threaded end projecting beyond said wall 11, and the operating handle 91 is screwed on this end of the bolt. By turning the handle in one direction or the other, the block 87 may be tightly clamped to, or may be released from, the braking surface 79 of element 29—78—79 to lock the casing 23 frictionally against, or free it for, tilting movement.

The casing 23 is tiltable by power by the following described means. Bolted to that wall 11 of frame 10 which is adjacent the element 29—78—79, is the casing of a known reversible and variable speed electric motor 94 of the gear head type having the usual controls (not shown) for varying the motor speed and reversing the direction of motor drive.

A worm 95, fixed on the known counter shaft 116 geared to the armature shaft of this motor, meshes with a worm gear 96 fixed on a shaft 97. Shaft 97 extends parallel to the axis of tilt of the casing 23 and has fixed thereon a pinion 98 which meshes with the toothed edge 78 of element 29—78—79. Shaft 97 is journaled in the casing of motor 94 and in the main framework. In the construction shown shaft 116 has a squared outer end portion 116a for application of a hand crank or wrench to manually rotate the shaft when desired.

The worm gearing 95—96 is a speed reducing and torque increasing worm gearing of the self-locking type so that the head 20 and casing 23 may be tilted either by hand or by power from the motor 94. The motor 94 and the parts located outside of the main frame and connecting the motor with segment 29—78 are all preferably covered by a housing 99 which is detachably held to the adjacent wall 11 of the framework 10.

Casing 23 is preferably kept substantially full of lubricating oil. The housing 72 covers the change speed spur gearing as well as the motor 77 and the bracket 67, and the housing 99 covers the motor 94 and its worm gearing.

In order that the main frame 10 may be mounted on a horizontal foundation with its divided wall 13—13 seated on said foundation, each section of said divided frame wall is provided adjacent its opposite ends with bolt holes 100 for use in bolting the frame to such a foundation. To handle certain kinds of work conveniently, it is desirable to support the main frame in various elevated positions with wall 13—13 disposed in an upstanding position either vertically or inclined. To permit secure mounting of the manipulator in such elevated positions, the wall 14 is provided adjacent flange 17 with two bolt holes 101 opposite those two of the bolt holes 100 which are farthest from wall 12, and a support is provided to be telescoped in the framework 10.

This support comprises a metal column 102 of U-shaped cross-section to which is welded two longitudinally extending metal strips 103 and two parallel and opposed longitudinally extending metal strips 104. The strips 104 provide inwardly projecting flanges along the side walls of the column, which flanges are adapted to slide along the inner faces of the respective sections of the divided frame wall 13—13. Strips 103 are slidable over the inner faces of metal washers or perforated blocks 105 welded to wall 14 with their perforations in registry with bolt holes 101.

Figures 5, 6, 7:
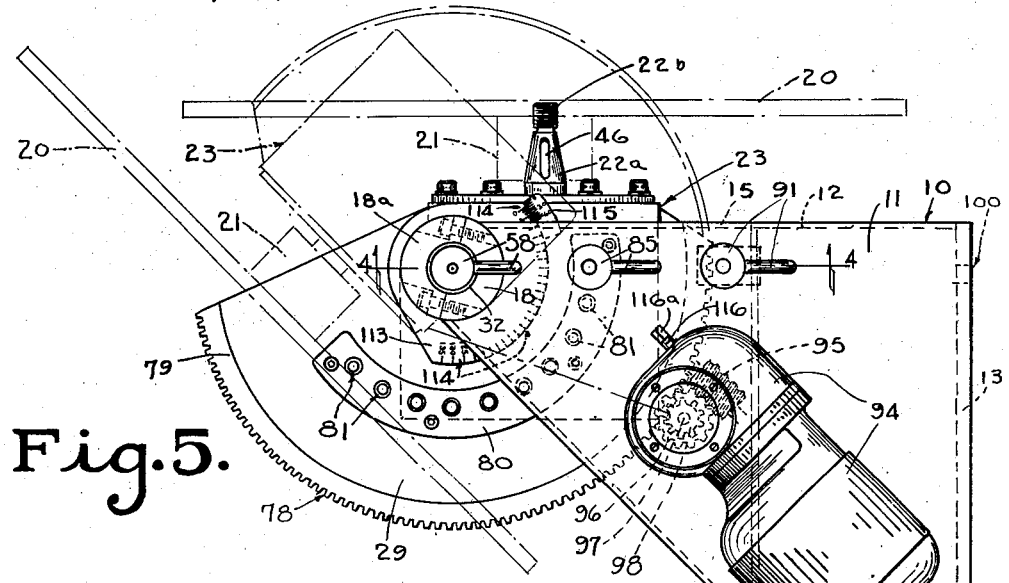
Figure 5 is a view showing the manipulator in side elevation with its main frame adjustably held to an upstanding column or pedestal secured to a base, the spindle for the work supporting head being shown extending vertically, and the head being indicated in dotted lines at each of its two limits of tilting movement.
Figure 6 is a detail sectional view on the line 6—6 of Figure 5.
Figure 7 is a detail sectional view on the line 7—7 of Figure 4.

The main frame 10 may be variably telescoped on the column. To hold the frame to the column at different levels, the column is provided with four vertical rows of bolt holes 106. Four bolts 107, and four nuts 108 for said bolts, are provided for adjustably bolting frame 10 to the column. In Figures 5 and 6 the frame is shown bolted to the column in its highest adjustable position. Frame wall 12 limits downward movement of the frame 10 on the column.

The lower end of the column may be set in a concrete or other foundation if desired, but is shown in Figure 5 fixed to an elongate base or foot 109 which is adapted to seat upon the ground or floor with said foot extending under the axis of tilt of the casing 23.

A segmented scale plate 113 is fixed to the outer face of segment 29—78 and provided with an arcuate series of graduations 114 coactive with the graduations of an arcuate vernier or auxiliary scale bar 115, which is fixed to main frame 10, to indicate the angle of tilt of the head 20.

The construction and mounting of the casing 23 and its trunnions and the construction and mounting of the spindle provide an extremely sturdy rotative and tiltable means adapted to withstand very heavy loads without breaking and without sagging of the parts between the frame bearings. The construction permits ready attachment to and detachment from the spindle of work carrying heads of different sizes and construction, permits ready assembly and disassembly of the parts which are either mounted in, or extend into, the tiltable casing, and permits the employment of closely juxtaposed frame bearings irrespective of the size of the work carrying head.

The described construction affords a very simple, strong and compact work manipulator adapted to impart a wide variety of positions to work of both large and small bulk in which a head-carrying spindle is tiltably and rotatively movable by means independent of the head carried by the spindle to position the work carrying head, and in which the parts of the manipulator which tilt with the work carrying head are small in number and weight. Work carrying heads provided with actuating means thereon are avoided.

Simple and compact means are provided for rotating the work carrying head in either one of two directions at will and at any desired speed within a wide range of speeds. The driving means provided for rotating the head is such that the worm gearing in the casing will normally hold the head against rotation. The clutch permits manual rotation of the head without requiring turning of any part of the driving train except the spindle. The worm gearing associated with motor 77 reduces the output speed sufficiently for practical use of the spur gear change speed assembly interposed between that worm gearing and the worm gearing in the casing 23. The shaft of the worm of the last-mentioned worm gearing may be manually rotated if desired and the change speed gearing and the motor 77 with its non-self-locking worm gearing may be omitted where hand rotation alone is desired. Manual turning of the worm shaft 62 is made possible by the fact that the gearing forming part of the motor 77 is not self-locking.

Provision is made for tilting by hand or by motor power. The self-locking gearing associated with motor 94 will hold the sector 29—78 through 98 when the motor is stopped with the head approximately in desired position, after which shaft 116 may be manually rotated to accurately position the head. The head may then be fixedly held by the latch plunger or by the friction locking block 87. The latch plunger 82 and the holes 81 in element 80 can be arranged to lock the head in selected positions for particular jobs.

I claim:

1. A work manipulator of the class described comprising, in combination, a main frame, a support having a pair of hollow trunnions journaled in the main frame for tilting of the support relatively to the frame, a spindle journaled in the support for rotation about an axis crossing and offset from the axis of tilting movement of the support, a work carrying head mounted centrally thereof on one end of the spindle, a drive shaft journaled in the support trunnions and extending axially through one of said trunnions to the exterior of the frame at one side of the frame, an electric motor mounted on and exteriorly of the main frame at said side of the frame, a driving train from said motor to said shaft for rotating the shaft, a worm mounted on said shaft to rotate with the shaft, a worm wheel in self-locking mesh with said worm and mounted on the spindle for relative rotation between the worm wheel and spindle, clutch means for connecting the worm wheel and spindle to rotate in unison, and actuating means for said clutch means extending to the exterior of the frame through the other one of said trunnions.

2. A work manipulator of the class described comprising, in combination, a main frame having two closely opposed side portions of right triangular outline and a connecting portion extending from one right edge of one of said side portions to the corresponding edge of the other one of said side portions, a box-like rectangular casing located between said side portions and having a pair of hollow trunnions journaled in said side portions substantially at the juncture of the other right edge and the inclined edge of each said side portion, the size of said casing being such that it extends substantially from one of said side portions of the frame to the other and is tiltable without contacting said connecting portion of the frame, a spindle journaled in two opposed walls of said casing with one end of the spindle projecting beyond one of said walls and with the spindle axis and the axis of tilt of the casing crossing at an angle of 90 degrees, a work supporting head held centrally thereof on said projecting end of the spindle to rotate with the spindle with the head projecting beyond said triangular side portions of the frame, one wall of said casing which is opposed to one of said side portions of the frame having a toothed arcuate edge located exteriorly of the casing and concentric with the axis of tilt of the casing, a pinion meshed with said toothed wall edge and journaled on the frame for caaction with said edge to tilt the casing and head through an angle of 135 degrees from a position in which the head is parallel with said inclined edges of said frame side portions and in a path carrying the head over the vertices of said side portions adjacent which the casing is journaled, means located out of the path of tilt of the head for reversely rotating said pinion and including a reversible rotation and variable speed electric motor held to the frame exteriorly of and at one side of the frame, self-locking worm gearing in said casing for rotating the spindle and including a worm wheel loose on the spindle, clutch means in said casing for connecting said spindle with and disconnecting it from said worm wheel, actuating means for said clutch means extending to the outside of the frame through one of the hollow trunnions of the casing, means located out of the path of tilt of the head for reversely driving said self-locking gearing and including a driving train extending from the worm gearing through the other hollow trunnion and a reversible rotation and variable speed electric motor held to the frame exteriorly of the frame at the adjacent side of the frame, and means engageable at will with the casing to releasably hold the casing in selected tilted positions and located out of the path of tilt of the head.

3. A work manipulator of the class described comprising, in combination, a frame having a pair of peaked projecting portions in opposed laterally spaced relation and each provided adjacent its peak with a different one of a pair of axially aligned trunnion bearings one-half of each of which bearings is detachable, a tiltable and substantially rectangular gearing-enclosing casing intermediate said pair of frame portions and extending substantially from one to the other of said portions, a pair of hollow trunnions journaled in said bearings and extending into the casing, a pair of axially aligned sleeves fixed to the casing and each embracing the inner end of a different one of said trunnions, means detachably holding each trunnion to its embracing sleeve against movement relatively to the sleeve, a spindle which is arranged with one end thereof projecting out of the casing for supporting and driving of a work carrying head and with the axis of the spindle crossing that of the trunnions at an angle of 90 degrees, anti-friction thrust bearings journaling the spindle in opposed walls of the casing, a worm gear loose on the spindle, said spindle having within the casing an enlarged portion one end of which abuts one of the thrust bearings and between the other end of which and the other one of the thrust bearings the worm gear is confined, a drive shaft extending inward from the exterior of the frame into the casing axially through one of said hollow trunnions and journaled in said sleeves, a worm fixed on the drive shaft between the inner ends of the trunnions and of the sleeves and meshing with the worm gear, a toothed clutch member splined on said enlarged portion of the spindle for sliding of said member axially of the spindle and rotation thereof in unison with the spindle, said worm gear having clutch teeth with which those of said clutch member are engageable and disengageable, manually operable means for controlling sliding of said clutch member extending inward from the exterior of the frame into the casing axially through the other one of said hollow trunnions and connected with the clutch member, a motor mounted on the frame, and a driving train from the motor to the outer end of the drive shaft, said motor and driving train being located outside of the path of tilting movement of the tiltable casing.

4. A work manipulator, as claimed in claim 3, in which there is provided a work carrying head having a hub which projects from one face only of the head, said hub having extending entirely therethrough an axial bore which is contractively tapered from the outer end of the hub toward the adjacent face of the head and is enlarged at the other end of the hub, in which the projecting end of the spindle has a tapered portion fitting in the tapered portion of said hub bore and keyed to the hub and also has a reduced screw threaded terminal portion located within said enlarged portion of the hub bore, and in which a retaining nut for the head is screwed on said threaded terminal portion of the spindle and is housed within said enlarged portion of the hub bore.

5. A work manipulator of the class described comprising, in combination, a frame, a tiltable support having a pair of hollow trunnions which are journaled in the frame for tilting of said support about an axis which is fixed relatively to the frame, a work head supporting and driving spindle carried by the tiltable support for rotation about an axis which is fixed relatively to the support and which crosses the axis about which the support is tiltable, a drive shaft for said spindle which extends inwardly from the exterior of the frame axially through one of said hollow trunnions, means connected with the outer end of the drive shaft for rotating the shaft, a worm fixed on the drive shaft between said trunnions, a worm gear carried by the tiltable support in constant mesh with the worm, a clutch carried by the tiltable support and actuative for clutching said worm gear with and de-clutching it from said spindle, and clutch actuating means extending inward from the exterior of the frame axially through the other one of said trunnions and connected with the clutch.

6. A work manipulator, as claimed in claim 5, wherein said clutch actuating means comprises a shifter for said clutch carried by the tiltable support for reciprocation of said shifter relatively to the support, spring means carried by the support and biasing the shifter to actuate the clutch to clutch the worm gear with the spindle, and manually turnable means extending axially through said other one of said trunnions from the exterior of the frame and journaled in said trunnion and connected with the shifter to actuate said shifter against the force of said spring means to de-clutch said worm gear from the spindle.

7. A work manipulator, as claimed in claim 5, having a gear segment which is movable in unison with the support about the axis about which the support is tiltable, which gear segment has in one face thereof and concentric with said axis an arcuate series of sockets, a spring pressed sliding plunger carried by and extending inward through the frame, and spring pressed toward said face of the segment with said plunger located for selective engagement of its inner end in said sockets, a manually operable cam connected with the outer end of said plunger for actuation of the cam to retract the plunger and hold it retracted from said segment, and means mounted on the frame and geared to the segment for oscillating the segment to tilt the support.

8. A work manipulator of the class described comprising, in combination, a gearing sealing casing, a supporting mount with which said casing has a pivotal connection sustaining the casing for tilting thereof relatively to said mount about an axis which is fixed relatively to the mount, said pivotal connection comprising a hollow trunnion fixed to said casing at one side of the casing and a bearing for said trunnion on said mount, a drive shaft which extends into the casing from the opposite side of the casing from that at which said hollow trunnion is located and which is journaled in the casing coaxially with said trunnion, means connected with the outer end of said drive shaft for rotating the shaft, a work head carrying spindle extending into and journaled in the casing with the spindle axis in crossed relation with the axis about which the casing is tiltable, a worm mounted within the casing and fixed on said drive shaft, a worm gear mounted within the casing in mesh with said worm, a clutch mounted within the casing for actuation to clutch the worm gear to and declutch it from the spindle, and actuating means for the clutch extending into the casing axially through said hollow trunnion and connected with the clutch.

HAROLD P. BENTLEY.

REFERENCES CITED

The following references are of record in the file of this patent:

UNITED STATES PATENTS

| Number | Name | Date |
|---|---|---|
| 2,208,251 | Evans | July 16, 1940 |
| 2,224,958 | Faber | Dec. 17, 1940 |
| 2,318,791 | Mueller | May 11, 1843 |
| 2,348,062 | Faber | May 2, 1944 |
| 2,396,161 | Cullen | Mar. 5, 1946 |